Nov. 26, 1968  J. M. WEINSTEIN  3,412,468
DENTURE FASTENER
Filed April 29, 1966  2 Sheets-Sheet 1
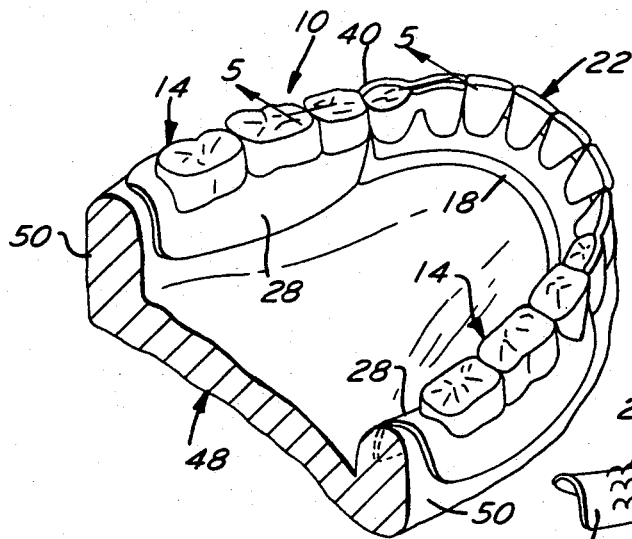
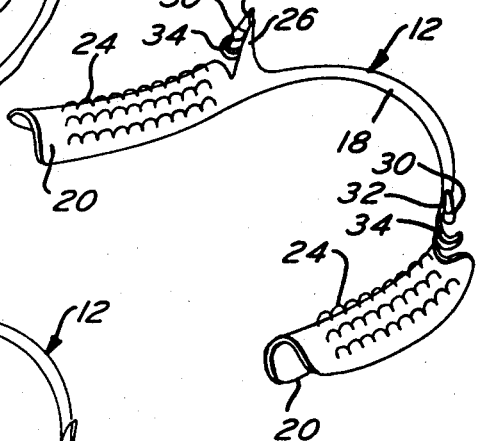
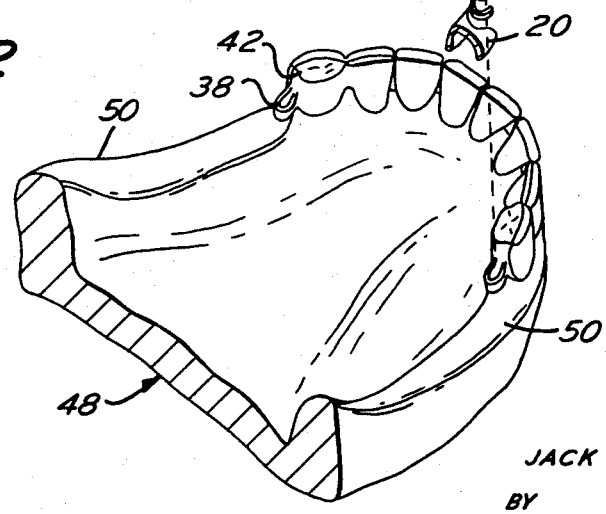
INVENTOR
JACK M. WEINSTEIN
BY
Caesar, Rivise, Bernstein & Cohen
ATTORNEYS.

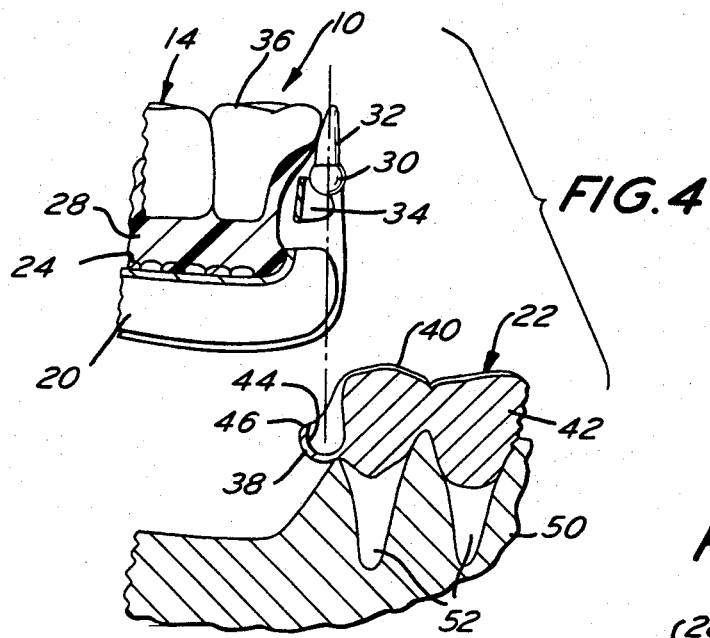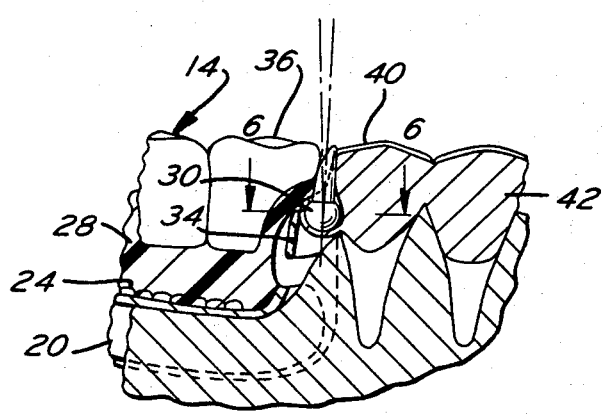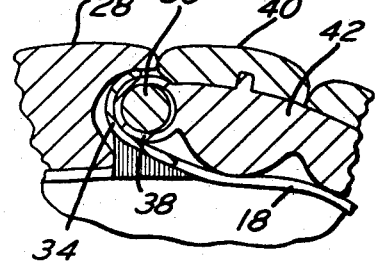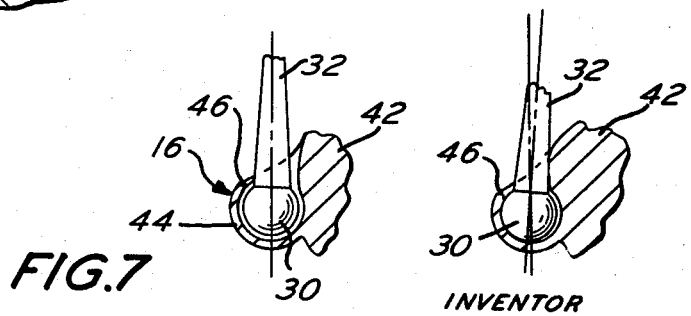

United States Patent Office 3,412,468
Patented Nov. 26, 1968

3,412,468
DENTURE FASTENER
Jack M. Weinstein, 2613 Elbridge St.,
Philadelphia, Pa. 19149
Filed Apr. 29, 1966, Ser. No. 546,275
10 Claims. (Cl. 32—5)

ABSTRACT OF THE DISCLOSURE

A denture fastener comprising a first member adapted to be attached to a pillar tooth and a second member adapted to be attached to a partial denture. The first member includes a socket having a substantially spherical concave inner wall. The second member includes a ball which is adapted to be inserted in the socket. The socket is configured to permit the ball to be vertically inserted into the socket. When the ball is rotated out of its vertical alignment by means of the gums pressing against the partial denture, the ball will be locked in the socket by a lip formed on the socket.

---

This invention relates to a denture fastener, and more particularly, a device for securing a partial denture in place.

Partial dentures are now in common usage. Generally, these dentures comprise a metal brace having the necessary artificial teeth secured thereon. Various anchoring means have been developed for securing the partial denture in place. Generally, these anchoring means comprise metal fastening elements having a first portion on a natural or pillar tooth and having a second portion on an adjacent tooth of the partial denture. The two means are releasably locked together when the partial denture is placed in the mouth of the user.

One of the major problems of the fastening means now in use is the fact that the securement is rigid. Thus, once the partial denture is inserted in place, it is held rigidly in place and there is no freedom of movement. Accordingly, many problems can be developed from this this type of securement. One of these problems is that if the partial denture is angled incorrectly in one direction, there will be a constant pressure against the gums of the user. If the denture is angled incorrectly in the opposite direction, there will be little or no pressure against the gums. However, under these conditions, there will be a constant force applied against the pillar tooth whenever mastication takes place. Thus, when chewing, the partial denture will be forced downwardly toward the gums and this will apply a torque or force against the pillar tooth, thereby tending to pull the pillar tooth out of its natural alignment.

Attempts have been made to pivotally secure a partial denture in place in order to obviate the problems of the rigid securement. However, any of the pivotal securements used in the past were rather elaborate structures which were visible when used and which could require a great deal of chair time in the fitting of the dentures. The denture fastener of this invention enjoys all of the advantages of the pivotal securement while at the same time possessing numerous advantages of its own over the prior pivotal securement fasteners.

It is therefore an object of this invention to provide a novel denture fastener.

It is another object of this invention to provide a denture fastener which pivotally secures the denture in place.

It is a further object of this invention to provide a denture fastener which exerts a minimum of leverage on the pillar tooth.

It is a further object of this invention to provide a denture fastener which permits a partial denture to readily adapt to the soft tissue and tooth supports without any irritation or settling of the denture.

It is a further object of this invention to provide a denture fastener which permits the easy insertion and removal of a denture with a minimum of patient education.

It is a further object of this invention to provide a novel denture fastener which is internally attached, thereby providing an improved esthetic effect.

It is a further object of this invention to provide a partial denture embodying a novel denture fastener.

These and other objects of this invention are accomplished by providing a denture fastener comprising a first member adapted to be permanently attached to a pillar tooth, a second member adapted to be permanently attached to a partial denture, said first member having a substantially spherical socket formed therein, said socket being open at its top, said second member including a ball adapted to be received within said socket, elongated means associated with said ball for securement to said partial denture, said ball adapted to be inserted into said socket when said elongated means is in a first plane, and said ball adapted to be locked in said socket when said elongated means is in a second plane.

Other objects and many of the attendant advantages of this invention will be readily appreciated as the same becomes better understood by reference to the following detailed description when considered in connection with the accompanying drawings wherein:

FIG. 1 is a schematic perspective view showing a partial denture embodying the denture fastener of this invention and secured in the lower mouth;

FIG. 2 is an exploded perspective view, partially in section, showing a partial denture embodying the denture fastener of this inventoin prior to insertion in the lower mouth;

FIG. 3 is a perspective view of a brace used for a partial denture, and showing a portion of the denture fastener of this invention;

FIG. 4 is an exploded sectional view showing the method of inserting a partial denture embodying the denture fastener of this invention into the mouth;

FIG. 5 is a sectional view showing the inserted partial denture of FIG. 4;

FIG. 6 is an enlarged sectional view taken along the line 6—6 of FIG. 5;

FIG. 7 is a sectional view showing the denture fastener of this invention immediately after insertion of a partial denture into the mouth; and FIG. 8 is a sectional view similar to FIG. 7, but showing the final position of the denture fastener of this invention after the partial denture has been placed in the mouth and permitted to assume its normal position.

Referring now in greater detail to the various figures of the drawings wherein similar reference characters refer to similar parts, a partial denture embodying the denture fastener of the present invention is generally shown at 10 in FIGS. 1 and 2. Partial denture 10 comprises a brace 12 (FIG. 3), artificial teeth 14 and denture fastener 16 (FIG. 7).

Brace 12 basically comprises an arcuate band 18 which terminates in a pair of arcuate sleeves 20. As seen in FIG. 1, band 18 conforms to the inner gum line at the base of the anterior teeth 22. Each sleeve 20 includes a series of looped wires 24 secured on its upper surface. A shoulder 26 projects upwardly from band 18 adjacent each sleeve 20.

Artificial teeth 14 are mounted in plastic bases 28 which are in turn secured on sleeves 20. Bases 28 can be any of the plastics generally used in the denture art, such as acrylic plastics, and have the same color as the gums of the user. The plastic bases 28 are secured on sleeves 20 by the flow of the plastic in loops 24 during the formation of the partial denture.

Denture fastener 16 includes a member comprising a substantially spherical ball 30 having a rod 32 projecting from the top thereof. Rod 32 is secured to shoulder 26 and projects vertically downward from the top of the shoulder. An arcuate clip 34 is secured to shoulder 26 and is horizontally spaced from ball 30, as best seen in FIGS. 4 and 5. Rod 32 and associated ball 30 are secured in place adjacent artificial abutment tooth 36.

Denture fastener 16 includes a female member 38 which is secured to a pillar tooth 40. As used herein, pillar tooth refers to a natural tooth or an artificial tooth which is held rigidly in place within the mouth. Female member 38 is secured in place by means of a crown 42 which is cemented to the pillar tooth 40 and the tooth adjacent the pillar tooth. Female member 38 includes a substantially spherical socket 44 formed therein. Socket 44 is open at its top and the outer wall of the member 38 forms a lip 46 at the opening of the socket.

In FIG. 1, the mouth of the user of the device of this invention is shown schematically at 48, with the gums shown at 50. As seen in FIG. 4, the pillar tooth 40 and its adjacent tooth include roots 52 secured in the gums.

The use of the device of this invention is best seen in FIG. 4. As seen therein, the partial denture 10 is positioned horizontally within the mouth and vertically spaced from the anterior teeth 22. In this position rod 32 will be in a substantially vertical plane, as indicated in FIG. 4. Thereafter, the partial denture is pushed vertically downward which permits ball 30 to enter the opening in socket 44. In doing this, sleeve 20 is pressed downwardly against the top surface of gums 50. After the partial denture has been inserted, the pressure against the gums is released which causes the rising of sleeves 20 and their associated artificial teeth. When this occurs, rod 32 and ball 30 are rotated to the plane shown in FIG. 8. This locks the partial denture in place because ball 30 will abut lip 46 and rod 32 will abut crown 40. Since the gums are resilient, they will maintain the ball and rod in the position shown in FIG. 8. When it is desired to remove the partial denture, a force is again applied against the rear end of sleeve 20 which will return the rod and ball to the position shown in FIG. 7. At this time, the partial denture can again be lifted vertically outward.

As seen in FIG. 5, clip 34 is configured so as to bypass female member 38 when the partial denture is inserted. After the gums caused the tilting of the partial denture, clip 34 will abut the external wall of female member 38. In this way, the clip serves as an additional releasable lock on the partial denture. When the partial denture is fitted to the patient, the dentist can bend clip 34 in order to insure that a secure fit will take place.

It is apparent from the above description that since the partial denture will be rotatably secured in place by the ball and socket arrangement, there is never a constant pressure against the gums of the user. The only time that any pressure will be applied against the gums will be during mastication. However, there will be no discomfort to the wearer during this time since the undersides of sleeves 20 are highly polished and smooth and there will be a comfortable fit between the sleeves and the gums. Whenever mastication is ceased, the partial denture will be returned immediately to the position shown in FIG. 5.

The partial denture embodying the denture fastener of this invention can be used in both the upper and lower mouth. Where the partial denture includes artificial teeth on only one side of the mouth, brace 12 can terminate with a sleeve on one side carrying the artificial teeth and shoulder 26 on the other side. Thus, in this instance, the partial denture will appear in substantially the form shown in FIG. 2, with one sleeve 20 eliminated. There will still be two ball and socket fasteners present in order to prevent any lateral movement of the partial denture.

Since the partial denture is freely rotatable about the ball 30, there is no torque or torsional force applied against the pillar tooth 40. Thus, there is no fear of forcing the pillar tooth from its normal alignment as would be the case when a rigid securement is made between the partial denture and the pillar tooth.

Another advantage of the denture fastener of this invention is a vast savings in chair time. Thus since the abutment teeth 36 and 40 do not require any special or unusual preparations, the denture can be inserted and fitted in one sitting. This is also accomplished in view of the fact that precise parallelism is not required, as would be required with the rigid denture fasteners.

Any of the materials known to the art can be used for the partial denture and denture fastener of this invention. Thus, the brace can be stainless steel. In order to avoid any irritation to the user, the brace will normally be highly polished. The artificial tooth can be porcelain or any of the plastics commonly used for artificial teeth.

Without further elaboration, the foregoing will so fully illustrate my invention, that others may, by applying current knowledge, readily adapt the same for use under various conditions of service.

What is claimed as the invention is:

1. A denture fastener comprising a first member adapted to be permanently attached to a pillar tooth, a second member adapted to be permanently attached to a partial denture, said first member having a socket formed therein, said socket being open on its top, said second member including a ball adapted to be received within said socket, said socket having a substantially spherical concave inner wall conforming in shape to said ball, elongated means associated with said ball for securement to said partial denture, locking means on said first member which permit said ball to be inserted into said socket when said elongated means lies in a first angular relationship with respect to said open top, and said locking means locking said ball in said socket when said elongated means lies in a second angular relationship with respect to said open top, with said ball abutting said concave wall and being rotatable therein.

2. The denture fastener of claim 1 and further including a clip associated with said second member, said clip adapted to contact the outer wall of said socket when said elongated means is in said second angular relationship.

3. The denture fastener of claim 1 wherein said locking means comprises a lip at the entrance to said socket.

4. In combination, a partial denture and a fastener therefor, said denture comprising a brace and artificial teeth mounted on said brace, said denture fastener comprising a first member permanently attached to a pillar tooth and a second member permanently attached to said partial denture, said first member having a socket formed therein, said socket being open at its top, said second member including a ball adapted to be received within said socket, said socket having a substantially spherical concave inner wall conforming in shape to said ball, elongated means associated with said ball and secured to said partial denture, locking means on said first member which permit said ball to be inserted in said socket when said elongated means lies in a first angular relationship with respect to said open top, and said locking means locking said ball in said socket when said elongated means lies in a second angular relationship with respect to said open top, with said ball abutting said concave wall and being rotatable therein.

5. The combination of claim 4 wherein said brace includes an upwardly projecting shoulder, with said elongated means secured to said shoulder.

6. The combination of claim 5 and further including a clip secured to said shoulder, said clip adapted to contact the outer wall of said socket when said ball is locked in said socket.

7. The combination of claim 4 wherein said brace comprises an arcuate band adapted to rest against the gums associated with anterior teeth, and includes an arcuate sleeve at each end of said band, said arcuate sleeves adapted to rest on the gums of the user of the partial denture, said arcuate sleeves having artificial teeth secured thereon.

8. The combination of claim 7 wherein two denture fasteners are used, with said brace including a shoulder adjacent the forward edge of each sleeve, with one of said elongated means secured to each other.

9. The combination of claim 4 wherein said denture fastener is positioned at the interior surface of said pillar tooth.

10. The combination of claim 4 wherein said locking means comprises a lip at the entrance to said socket.

References Cited
UNITED STATES PATENTS

| | | | |
|---|---|---|---|
| 1,519,505 | 12/1924 | Noyes | 32—5 |
| 2,982,024 | 5/1961 | Thompson | 32—7 |

FOREIGN PATENTS

| | | |
|---|---|---|
| 1,088,187 | 9/1960 | Germany. |
| 541,013 | 3/1956 | Italy. |
| 585,942 | 11/1958 | Italy. |
| 263,418 | 8/1949 | Switzerland. |

LOUIS G. MANCENE, *Primary Examiner.*

SETH NATTER, *Assistant Examiner.*